Sept. 15, 1931. J. H. ROBERTSON 1,823,125
VARIABLE SPEED FRICTION GEARING
Filed July 30, 1930
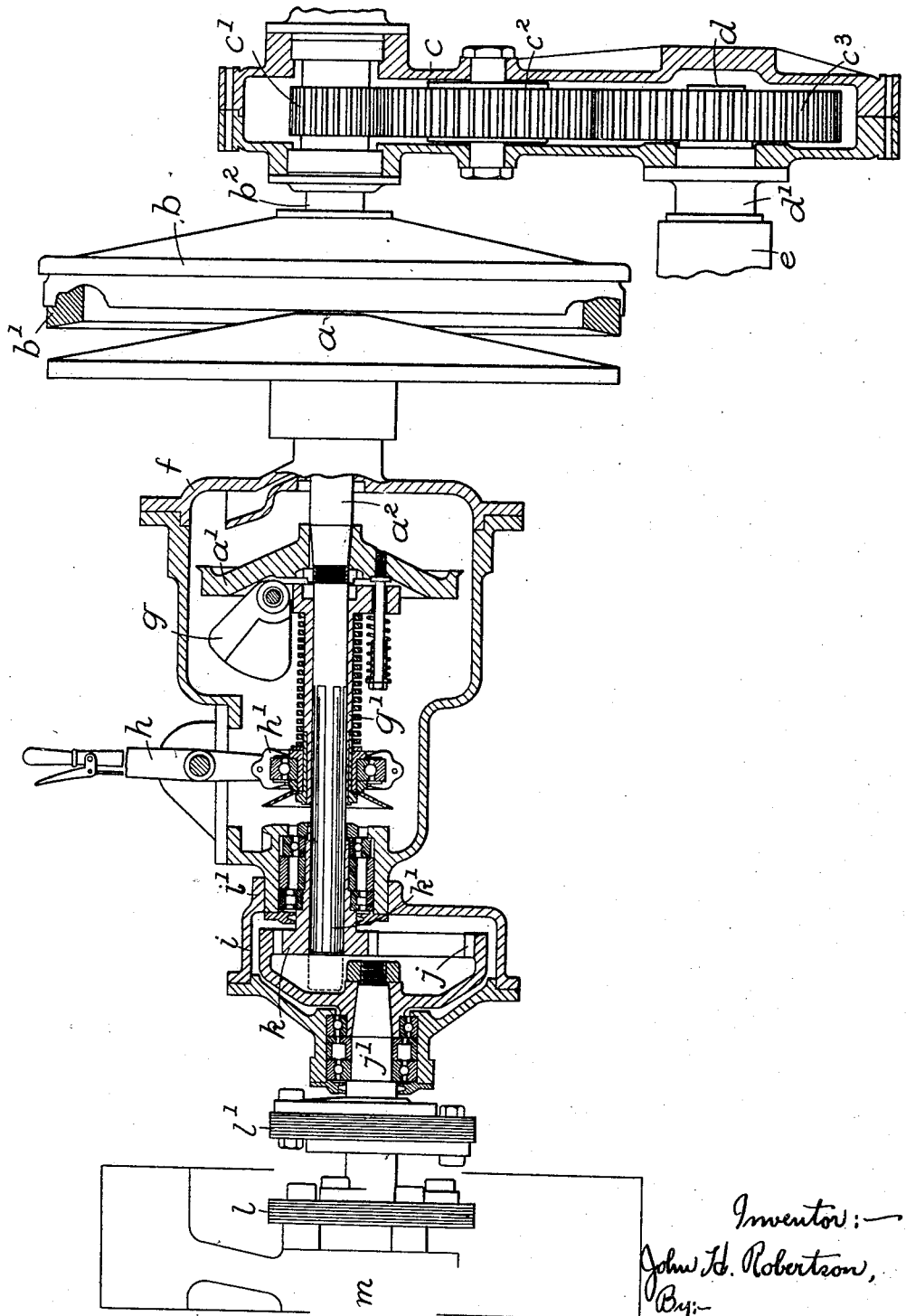
Inventor:—
John H. Robertson,
By:—
Smith, Michael and Gardiner,
Attorneys.

Patented Sept. 15, 1931

1,823,125

UNITED STATES PATENT OFFICE

JOHN HOGG ROBERTSON, OF LONDON, ENGLAND

VARIABLE SPEED FRICTION GEARING

Application filed July 30, 1930, Serial No. 471,767, and in Great Britain September 5, 1929.

This invention relates to variable speed friction gearing and has reference more particularly to the application of friction gearing to mechanism driven by slow speed motors, such as Diesel engines, and to relatively heavy duties, such as the driving of narrow-gauge locomotives.

It is well known that the power which can be transmitted through a friction gearing decreases with a fall of speed; further, in an automatic variable speed friction gearing having its operation controlled by a centrifugal or other governor, the effectiveness of the governor falls off rapidly as the speed decreases. For these two reasons, an automatic variable speed friction gearing designed for use on a medium or high speed driving shaft is quite unsuitable for transmitting the same power from a slow speed driving shaft.

According to the present invention, I provide a speed-multiplying gear or mechanism for coupling a slow speed driving or output shaft to an automatic variable speed friction gearing controlled by a governor, so that both the friction gearing and the governor can conveniently be driven at higher speed, more suitable for their economical and effective operation.

The automatic variable speed friction gearing is preferably of the type described in the specification of my prior Patent No. 1,772,593, dated August 12, 1930.

In the specification of my pending patent application Serial No. 379,752 I have also described a friction gearing having the supporting radius arm for the driven member combined with a supplementary reducing train of gears or chain gearing, whereby the speed of the final driven shaft can be reduced below that of the said driven member; by utilizing this arrangement in conjunction with a speed-multiplying gear for driving the friction gearing, the latter can be operated effectively at high speed, while transmitting power from a slow speed driving shaft to a slow speed driven shaft, with automatic variation of the transmission ratio according to circumstances.

The accompanying drawing represents in part sectional elevation an automatic variable speed friction gearing coupled to a slow-speed driving shaft on one side and to a slow-speed driven shaft on the other, in accordance with the present invention.

The variable friction gearing comprises a driving disc $a$ of conical shape, adapted to engage with a driven member $b$ at the friction surface $b^1$ of the latter, the member $b$ being supported at the free end of a radius arm $c$, which is formed as a casing to enclose three spur gears $c^1$ $c^2$ $c^3$; the smallest of these gears $c^1$ is fast with the shaft $b^2$ of the driven member $b$, the second gear wheel $c^2$ is an idler mounted on a fixed axle, while the third and largest gear wheel $c^3$ is secured to the driven shaft $d$, around the axis of which the radius arm $c$ is adapted to swing. As shown, the radius arm casing is secured to a flanged bush $d^1$ rotatable in a fixed support $e$ and forming a bearing for the driven shaft. The axial pressure required to maintain frictional engagement of the members $a$, $b$, may be applied to the radius arm either through the flanged bush $d^1$ or from the opposite side of the casing, or at the free end in line with the shaft $b^2$ by means of one or more rollers travelling on a curved guide track.

The axial movement of the driving disc $a$ is produced by a governor device enclosed in the fixed casing $f$ and comprising a set of weighted cams $g$ which engage with a thrust plate $a^1$ secured to the slidable shaft $a^2$ of the disc $a$, as described in the specification of my Patent No. 1,780,540, granted November 4th, 1930, the governor sleeve $g^1$ being also displaceable axially by hand if desired by means of a hand lever $h$ for regulating the position of a thrust collar $h^1$ forming an abutment for the sleeve, as described in the specification of my pending application Serial 411,095.

At the end of the casing $f$ which encloses the governor, I provide a gear casing $i$ which can be fitted by a spigot and socket joint $i$ to the casing $f$, and inside this gear casing I mount an internally toothed ring $j$ meshing with a pinion $k$ connected by a splined joint $k^1$ to the slidable shaft $a^2$. The internally toothed ring $j$ is secured upon a short shaft $j^1$ projecting from the opposite side of the gear casing $i$, the outer end of the shaft $j^1$ being coupled for example by fabric joints $l\ l^1$ to the slow speed driving shaft $m$ of the Diesel engine or other motor.

The velocity ratio of the multiplying gears $j\ k$ enclosed in the gear casing $i$ may be two to one, for example, an additional reduction of an equivalent amount being provided for the driven member of the friction gearing by means of the demultiplication gear $c^1\ c^2\ c^3$ so that the required overall transmission ratio may be realized. Thus, if the demultiplication gear gave a reduction of three to two with a directly driven friction gearing, as in specification of my serial application No. 379,752 aforesaid and the speed-multiplying gear $j\ k$ gives an increase of two to one, the demultiplication gears $c^1\ c^2\ c^3$ must give a reduction of three to one to obtain the same relative speeds of the driving and driven shafts.

It will be understood that the invention is not limited to the particular construction described and that the arrangement may be modified to suit the conditions of any particular application. For example, the multiplying gears $j\ k$ may be replaced by a pair of chain sprockets of unequal size, the larger being secured on the shaft $j^1$ and connected by a roller or silent chain to a smaller sprocket driving the shaft $a^2$, as will be obvious.

What I claim is:—

1. In an automatic variable speed friction gearing, comprising a driving disc member, a driven member having frictional engagement with said disc member, and a governor device rotating with said disc member, said governor device controlling the transmission ratio of said members, the combination of a driving shaft, a speed-multiplying mechanism connected to said driving shaft, and means for operating said disc member by said speed-multiplying mechanism, whereby the speeds of said driving disc member and of said governor device are increased relatively to that of said driving shaft.

2. A variable speed friction gearing, comprising a slow-speed driving shaft, a speed-multiplying mechanism connected to said driving shaft, a friction driving disc member operated by said speed-multiplying mechanism at a speed approximately double that of said driving shaft, a driven member in frictional engagement with said disc member, automatic means for controlling the transmission ratio of said members, a speed-reducing mechanism connected to said driven member, and a driven shaft operated by said speed-reducting mechanism at a speed less than half that of said driven member.

3. A variable speed friction gearing, comprising a slow-speed driving shaft, a speed-multiplying mechanism connected to said driving shaft, a friction driving disc member operated by said speed-multiplying mechanism at a speed greater than that of said driving shaft, a driven member in frictional engagement with said disc member, a governor device rotating with said disc member, said governor device controlling the transmission ratio of said members, a driven shaft operated by said driven member, and a speed-reducing mechanism connected between said driven member and said driven shaft.

4. A variable speed friction gearing, comprising a slow-speed driving shaft, a speed-multiplying mechanism connected to said driving shaft, a friction driving disc member operated by said speed-multiplying mechanism at a speed greater than that of said driving shaft, a driven member in frictional engagement with said disc member, a speed-reducing mechanism connected to said driven member, a governor device rotating with said disc member, said governor device controlling the transmission ratio of said members, and a driven shaft operated by said speed-reducing mechanism, the transmission ratio of said driving and driven shafts varying with the transmission ratio of said members as determined by said governor device.

In testimony whereof I have affixed my signature.

JOHN HOGG ROBERTSON.